United States Patent
Pace et al.

(10) Patent No.: US 9,358,726 B2
(45) Date of Patent: Jun. 7, 2016

(54) LABELLING MACHINE AND A METHOD FOR APPLYING TUBULAR LABELS TO RESPECTIVE ARTICLES

(75) Inventors: Raffaele Pace, Parma (IT); Mirko Rossi, Parma (IT)

(73) Assignee: SIDEL S.P.A. CON SOCIO UNICO, Parma (IT)

( * ) Notice: Subject to any disclaimer, the term of this patent is extended or adjusted under 35 U.S.C. 154(b) by 0 days.

(21) Appl. No.: 13/390,067

(22) PCT Filed: Aug. 12, 2009

(86) PCT No.: PCT/IT2009/000381
§ 371 (c)(1),
(2), (4) Date: May 25, 2012

(87) PCT Pub. No.: WO2011/018806
PCT Pub. Date: Feb. 17, 2011

(65) Prior Publication Data
US 2012/0227897 A1    Sep. 13, 2012

(51) Int. Cl.
*B29C 65/78* (2006.01)
*B29C 53/44* (2006.01)
(Continued)

(52) U.S. Cl.
CPC ............. *B29C 65/7885* (2013.01); *B29C 53/44* (2013.01); *B29C 63/426* (2013.01);
(Continued)

(58) Field of Classification Search
CPC .. B29C 53/44; B29C 66/81871; B29C 65/18; B29C 65/224; B29C 65/30; B29C 65/38; B29C 65/7885; B29C 66/112; B29C 66/1122; B29C 66/431; B29C 66/81453; B29C 66/8161; B29C 66/8227
USPC ....... 156/308.4, 350, 351, 367, 368, DIG. 25, 156/DIG. 27, DIG. 37, DIG. 44, 212, 215, 156/218, 446–458, 556, 557, 580, 583.1, 156/583.2
See application file for complete search history.

(56) References Cited

U.S. PATENT DOCUMENTS 2,650,183 A * 8/1953 Langer ........................... 156/282
3,668,048 A * 6/1972 Noguchi et al. ............... 156/498
(Continued)

FOREIGN PATENT DOCUMENTS

DE    102007057177 A1    5/2009
GB        1091917 A       11/1967
(Continued)

OTHER PUBLICATIONS

JP05-261563 Machine Translation; Hayashi; Oct. 12, 1993.*
(Continued)

*Primary Examiner* — Jeff Aftergut
*Assistant Examiner* — Jaeyun Lee
(74) *Attorney, Agent, or Firm* — Finnegan, Henderson, Farabow, Garrett & Dunner LLP (57) ABSTRACT

A labelling machine for applying tubular labels to articles; the machine comprises a conveying device movable along a given path and at least one unit to receive and retain an article to be labelled, a feeder to feed a label to the unit, a former to bend the label in a vertical tubular configuration with opposite vertical edges overlapping one another, and at least one welding device arranged on the conveying device to weld the overlapped edges of the label; the welding device comprises an electrically heatable sealing element, provided with a striplike working surface having a height at least equal to the height of the label overlapped edges to be welded, electrical power supplying means selectively connectable to the sealing element and controlled for heating the sealing element along a given portion of the mentioned path and for cooling the sealing element along a subsequent portion of the path, and actuator displacing the sealing element to and from the overlapped edges of the label along a horizontal direction transverse to the path.

15 Claims, 7 Drawing Sheets

(51) Int. Cl.
  *B29C 63/42* (2006.01)
  *B29C 65/22* (2006.01)
  *B29C 65/30* (2006.01)
  *B29C 65/38* (2006.01)
  *B29C 65/00* (2006.01)
  *B65C 3/06* (2006.01)
  *B29C 65/08* (2006.01)
  *B29K 709/02* (2006.01)
  *B29L 31/00* (2006.01)

(52) U.S. Cl.
  CPC ............. *B29C65/224* (2013.01); *B29C 65/30* (2013.01); *B29C 65/38* (2013.01); *B29C 65/7847* (2013.01); *B29C 66/0342* (2013.01); *B29C 66/1122* (2013.01); *B29C 66/4322* (2013.01); *B29C 66/496* (2013.01); *B29C 66/5326* (2013.01); *B29C 66/8161* (2013.01); *B29C 66/81811* (2013.01); *B29C 66/81871* (2013.01); *B29C 66/8242* (2013.01); *B29C 66/8322* (2013.01); *B29C 66/91421* (2013.01); *B29C 66/91443* (2013.01); *B29C 66/91445* (2013.01); *B29C 66/91655* (2013.01); *B29C 66/91951* (2013.01); *B65C 3/065* (2013.01); *B29C 65/08* (2013.01); *B29K 2709/02* (2013.01); *B29L 2031/744* (2013.01); *Y10T 156/1033* (2015.01)

(56) References Cited

U.S. PATENT DOCUMENTS

| | | | | |
|---|---|---|---|---|
| 3,867,226 | A | * | 2/1975 | Guido et al. .................. 156/229 |
| 4,070,513 | A | * | 1/1978 | Rhoads ........................ 428/34.9 |
| 4,302,275 | A | * | 11/1981 | Burmeister et al. .......... 156/446 |
| 4,501,951 | A | * | 2/1985 | Benin et al. ................... 219/243 |
| 4,555,296 | A | * | 11/1985 | Burtch et al. ................. 156/446 |
| 5,415,721 | A | * | 5/1995 | Nickey et al. ................. 156/447 |
| 5,653,085 | A | * | 8/1997 | Suga ............................... 53/75 |
| 2006/0113024 | A1 | * | 6/2006 | Panzetti ......................... 156/84 |

FOREIGN PATENT DOCUMENTS

| | | | | |
|---|---|---|---|---|
| GB | 1091917 | A | * 11/1967 | .............. H05B 3/06 |
| GB | 2011344 | A | 7/1979 | |
| JP | 05-261563 | | * 10/1993 | ............. B23K 11/24 |
| WO | WO-2004/020291 | A1 | 3/2004 | |
| WO | WO-2005/085073 | A1 | 9/2005 | |
| WO | WO-2007/148189 | A1 | 12/2007 | |

OTHER PUBLICATIONS

"International Application Serial No. PCT/IT2009/000381, International Search Report mailed May 31, 2010", 4 pgs.

"International Application Serial No. PCT/IT2009/000381, Written Opinion mailed May 31, 2010", 5 pgs.

* cited by examiner

LABELLING MACHINE AND A METHOD FOR APPLYING TUBULAR LABELS TO RESPECTIVE ARTICLES

PRIORITY CLAIM AND RELATED APPLICATIONS

This application is a nationalization under 35 U.S.C. 371 of PCT/IT2009/000381, filed Aug. 12, 2009, and published as WO 2011/018806 A1 on Feb. 17, 2011; which application and publication are incorporated herein by reference in their entirety.

TECHNICAL FIELD

The present invention relates to a labelling machine for forming tabular labels, in particular made of heat-shrinking film, and for applying these labels to respective articles, such as bottles or generic containers, which the following description will refer to, although this is in no way intended to limit the scope of protection as defined by the accompanying claims; the present invention also relates to a method for performing the above-mentioned operations.

BACKGROUND ART

As it is generally known, labelling machines are used to apply labels to containers of all sort. Typically used with beverage bottles or vessels are tubular labels (commonly called "sleeve labels"), which are obtained by:
cutting the web unwound from a supply roll into a plurality of rectangular or square labels;
bending each label in a tubular configuration such that the opposite vertical edges overlap one another; and
welding the overlapped edges of each tubular label.

A particular type of labelling machine is known, in which each tubular label is formed onto a relative cylindrical winding body (commonly called "sleeve drum") in order to be then transferred onto the relative container, for instance by inserting the latter inside the tubular label.

This type of labelling machine basically comprises a carousel rotating about a vertical axis to define a circular path, along which it receives a succession of unlabelled containers and, then, a succession of rectangular or square labels from respective input wheels, allows application of the labels in a tubular configuration onto the respective containers and releases the labelled containers to an output wheel.

More specifically, the carousel comprises a number of operating units which are equally spaced about the rotation axis, are mounted along a peripheral edge of the carousel and are moved by the latter along the above-mentioned circular path.

Each labelling unit comprises a bottom supporting assembly adapted to support the bottom wall of a relative container and an upper retainer adapted to cooperate with the top portion of such container to hold it in a vertical position during the rotation of the carousel about the vertical axis.

Each supporting assembly comprises a vertical hollow supporting mount, secured to a horizontal plane of rotary frame of the carousel, and a cylindrical winding body, engaging the supporting mount in sliding and rotating manner with respect to its axis, and adapted to carry a relative container on its top surface and a relative label on its lateral surface.

Each winding body is movable, under the control of cam means, between a raised position and a fully retracted position within the relative supporting mount.

In the raised position, each winding body protrudes from a top surface of the relative supporting mount and is adapted to receive a relative label on its lateral surface from the label input wheel; in particular the label is wrapped around the winding body such that the opposite vertical edges of the label overlap one another.

In the fully retracted position, which is reached at the container input and output wheels, the top surface of each winding body is flush with the top surface of the supporting mount so that containers are transferred onto and from the carousel along the same transfer plane.

After the welding of the overlapped edges of a tubular label, the movement of the relative winding body from the raised position to the fully retracted position produces the insertion of the relative container inside the label, making the so obtained container ready to be transferred to the output wheel.

Recently, it has been proposed to use the ultrasound technology for welding the overlapped edges of the tubular labels.

An example of the application of this technology to the labelling field is shown in the International Patent Application No. WO 2005/085073.

According to this solution, each ultrasound welding device is arranged on the carousel in a radially inner position with respect to the relative winding body.

More specifically, each ultrasound welding device is assembled on a bracket of a relative turret carried by the carousel in front of a relative labelling unit.

In use, each welding device is first moved horizontally in a radial direction with respect to the carousel rotation axis towards the label overlapped edges to be welded and, then, once having come in contact with the latter, is moved vertically for the whole height of the overlapped edges to perform the welding action.

After having ended the welding step, each welding device is detached from the relative label and returned to its starting position along an analogous path, including a first horizontal movement and a second vertical movement.

The above-described solution has the following drawbacks.

First of all, the ultrasound technology does not permit to weld any type of labels; for instance, some particular colors may render the labels opaque to ultrasounds.

Besides, to obtain welding of the label overlapped edges through the ultrasound technology is necessary to operate at high frequencies which may produce some inaccuracies in the welding operation.

Moreover, possible presence of micro-fractures in the sonotrode of an ultrasound welding device may produce stop of the ultrasound waves flow at certain frequencies; with consequent unsuccessful welding.

Furthermore, due to the fact that the ultrasound welding operation is carried out by a sequence of four movements according to two Cartesian axes, the whole time for completing this operation is in general relatively long. By also considering that one ultrasound welding device is provided for each winding body, the system for controlling and performing the welding operations on a labelling machine of this type is extremely complex.

DISCLOSURE OF INVENTION

It is an object of the present invention to provide a labelling machine for applying tubular labels to respective articles, which allows to overcome the above drawbacks in a straightforward and low-cost manner.

This object is achieved by a labelling machine, as claimed in claim 1.

The present invention also relates to a method for applying tubular labels to respective articles, as claimed in claim 8.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
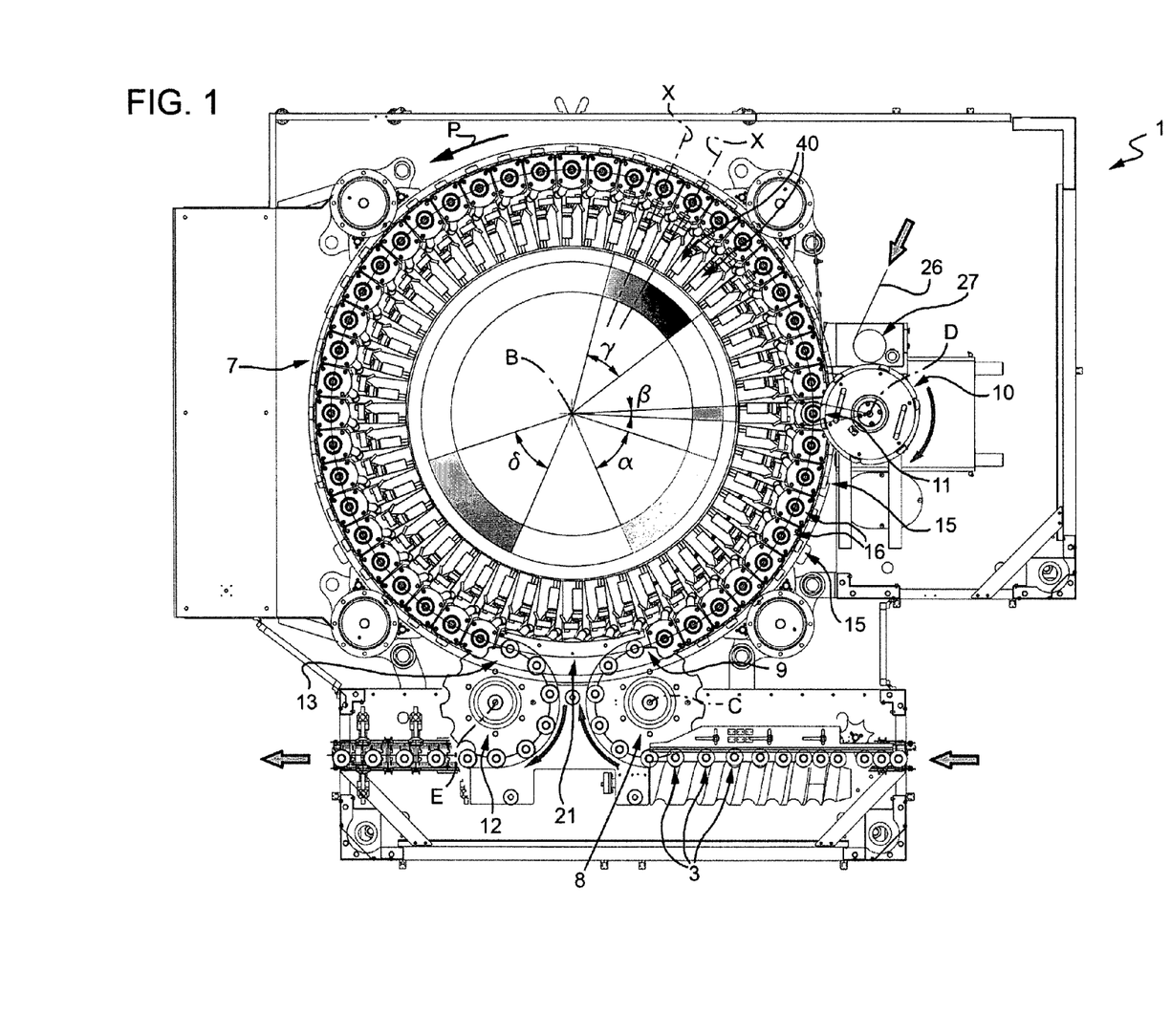
FIG. 1 shows a schematic plan view, with part removed for clarity, of a labelling machine in accordance with the teachings of the present invention.

Number 1 in FIG. 1 indicates as a whole a labelling machine for applying labels 2 (FIGS. 2 to 5) to respective articles or more specifically containers, particularly bottles 3, each of which (FIGS. 1 to 3) has a given longitudinal axis A, is bonded at the bottom by a bottom wall 4 substantially perpendicular to axis A, and has a top neck 5 substantially coaxial with axis A.

Machine 1 comprises a conveying device that serves to bend and weld labels 2 in a tubular configuration (FIGS. 3 to 5) and to produce insertion of bottles 3 into the so formed tubular labels 2.

In the preferred embodiment as illustrated on the Figures, the conveying device comprises a carousel 7, which is mounted to rotate continuously (anticlockwise in FIG. 1) about a respective vertical axis B perpendicular to the FIG. 1 plane.

The carousel 7 receives a succession of unlabelled bottles 3 from an input wheel 8, which cooperates with carousel 7 at a first transfer station 9 and is mounted to rotate continuously about a respective longitudinal axis C parallel to axis B.

The carousel 7 also receives a succession of rectangular or square labels 2 from an input drum 10, which cooperates with carousel 7 at a second transfer station 11 and is mounted to rotate continuously about a respective longitudinal axis D parallel to axes B and C.

The carousel 7 releases a succession of labelled bottles 3 to an output wheel 12, which cooperates with carousel 7 at a third transfer station 13 and is mounted to rotate continuously about a respective longitudinal axis E parallel to axes B, C and D.

The carousel 7 comprises a number of operating units 15, which are equally spaced about axis B, are mounted along a peripheral edge of carousel 7, and are moved by carousel 7 along a circular path P extending about axis B and through transfer station 9, 11 and 13.

As shown in FIG. 1, transfer station 11 is arranged, along path P, downstream from transfer station 9 and upstream from transfer station 13.

With particular reference to FIGS. 2 to 5, each unit 15 comprises a conveying module 16 adapted to receive a relative bottle 3 from input wheel 8 in vertical position, i.e. with the relative axis A parallel to axes B, C, D, and to hold said bottle 3 in such position along path P from transfer station 9 to transfer station 13.

Figure 2:
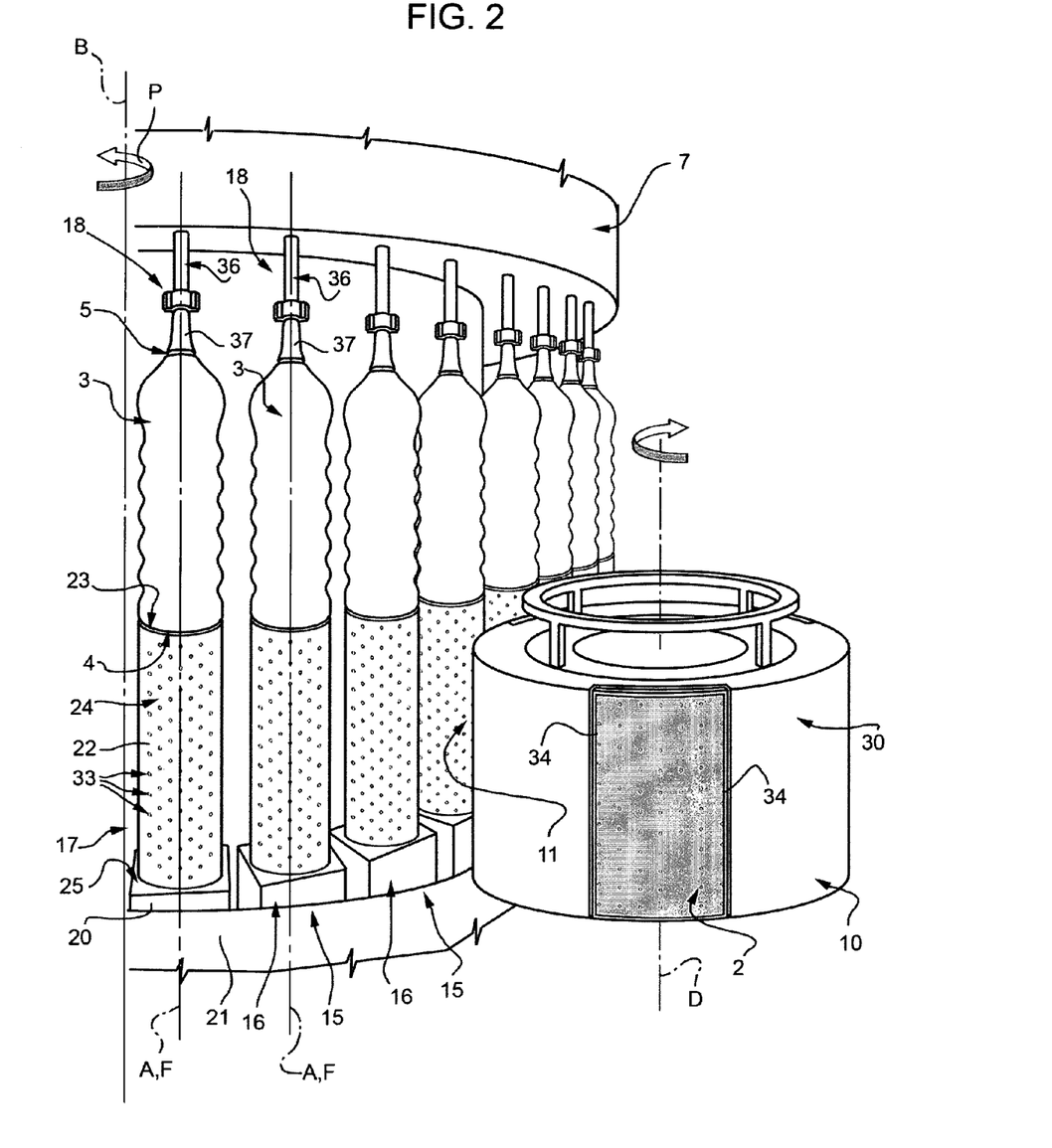
FIG. 2 shows a larger-scale view in perspective of a label transfer portion of the FIG. 1 labelling machine.
Figure 3:
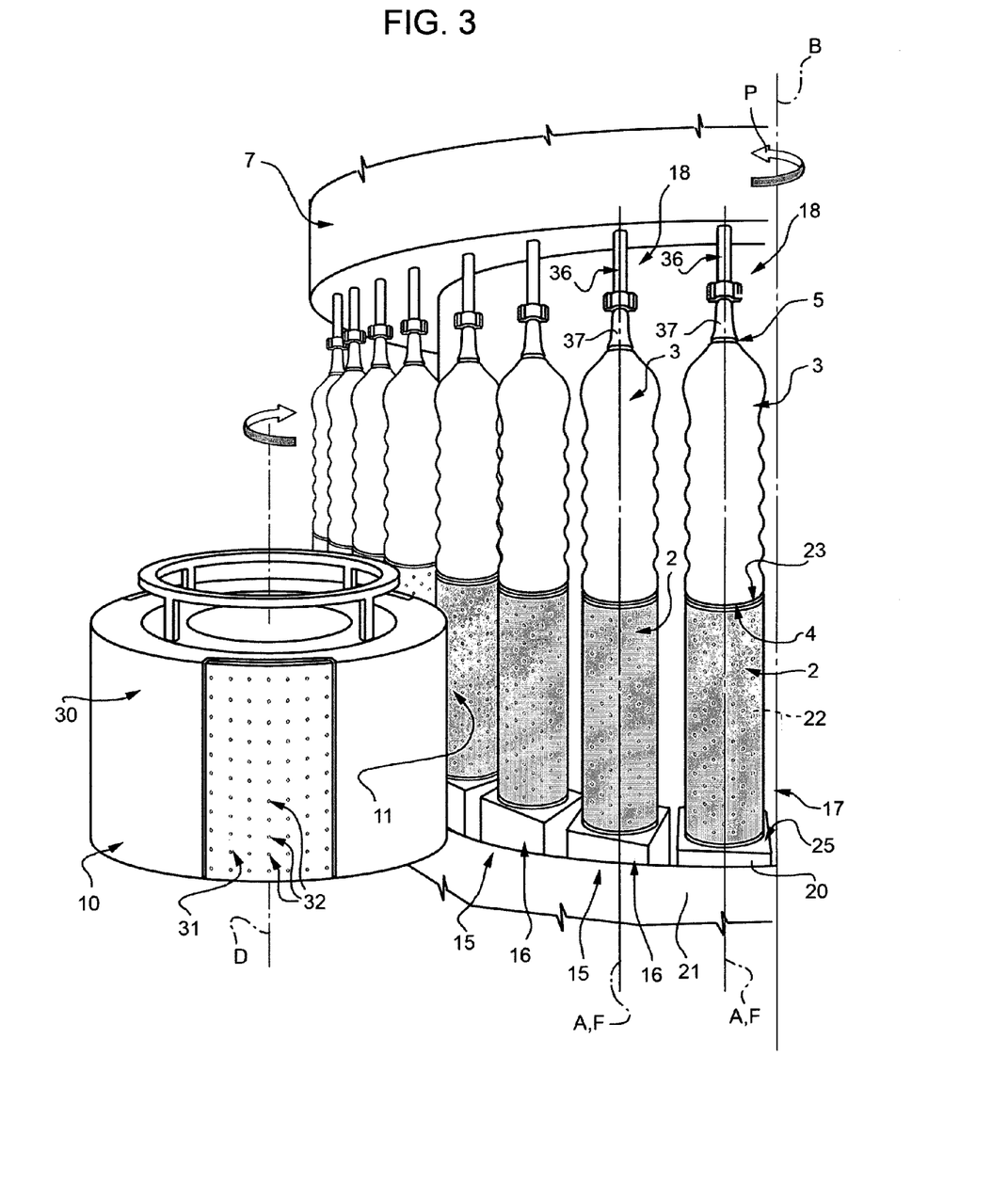
FIG. 3 shows another view in perspective of Figure label transfer portion taken from a different direction.

Each conveying module 16 comprises a bottom supporting assembly 17 adapted to support the bottom wall 4 of a relative bottle 3 and an upper retainer 18 adapted to cooperate with the top neck 5 of the bottle 3.

In particular, each supporting assembly 17 comprises:
a hollow supporting mount 20, which has a vertical axis F, parallel to axes B, C, D and E, and is secured to a horizontal plane or table of a rotary frame 21 of carousel 7; and
a cylindrical winding body 22, engaging the supporting mount 20 in sliding and rotating manner with respect to axis F, and adapted to carry coaxially a relative bottle 3 on its top surface 23 and a relative label 2 on its lateral surface 24.

In particular, each winding body 22 can be moved along axis F in a known manner, under the control of can means (not shown), between a fully retracted position within the relative supporting mount 20 and a raised position (FIGS. 2 to 5).

In the fully retracted position, each winding body 22 is completely housed within the relative supporting mount 20 so that its top surface 23 is flush with a top surface 25 of the supporting mount 20.

In the raised position, each winding body 22 protrudes from the top surface 25 of the relative supporting mount 20 and is adapted to receive, on its lateral surface 24, a relative label 2 from input drum 10.

More specifically labels 2 are cut in a know manner from a web 26 (FIG. 1) by a cutting device 27 (only schematically shown in FIG. 1) and fed to input drum 10 to be then transferred to the relative winding bodies 22.

As shown in FIGS. 2 and 3, the cut labels 2 are retained on a lateral surface 30 of input drum 10 by suction; in fact, the lateral surface 30 of input drum 10 is divided into a given number, three in the embodiment shown, of suction regions 31, which are equally spaced about axis D, are each provided with a plurality of through holes 32 connected to a pneumatic suction device (known per se and not shown) and are adapted to cooperate with respective labels 2.

In a completely analogous manner, the lateral surface 24 of each winding body 22 is provided with a plurality of through holes 33, in turn connected to a pneumatic suction device (known per se and not shown) so as to retain the relative label 2 by suction.

At the transfer station 11, each winding body 22 can be rotated in a know manner about the relative axis F under the control of relative actuator means (not shown) in order to produce the complete wrapping of the relative label 2, coming from input drum 10, on lateral surface 24. More specifically, each label 2, fed by input drum 10, is wrapped around the relative winding body 22 so as to form a cylinder with the opposite vertical edges 34 overlapped one another.

As shown in FIGS. 2 and 3, each retainer 18 comprises, in a known manner, a cylindrical movable member 36, which protrudes vertically from an upper portion of rotary frame 21 of carousel 7, can be displaced along the relative axis F and has a bell-shaped free end portion 37 adapted to cooperate with the top neck 5 of the bottle 3 carried by the corresponding bottom supporting assembly 17.

More specifically, the displacements of each movable member 36 are controlled in a known manner so as to maintain the same distance between its end portion 37 and the top surface 23 of the corresponding winding body 22, during the movement of the relative unit 15 along the portion of path P from transfer station 9 to transfer station 13, and to increase such distance at transfer stations 9, 13 and during the portion of path P from station 13 to station 9. In this way, bottles 3 are securely hold in their vertical positions during the travel from station 9 to station 13 and are free to be transferred at such stations 9 and 13 from input wheel 8 and to output wheel 12, respectively.

Figure 4:
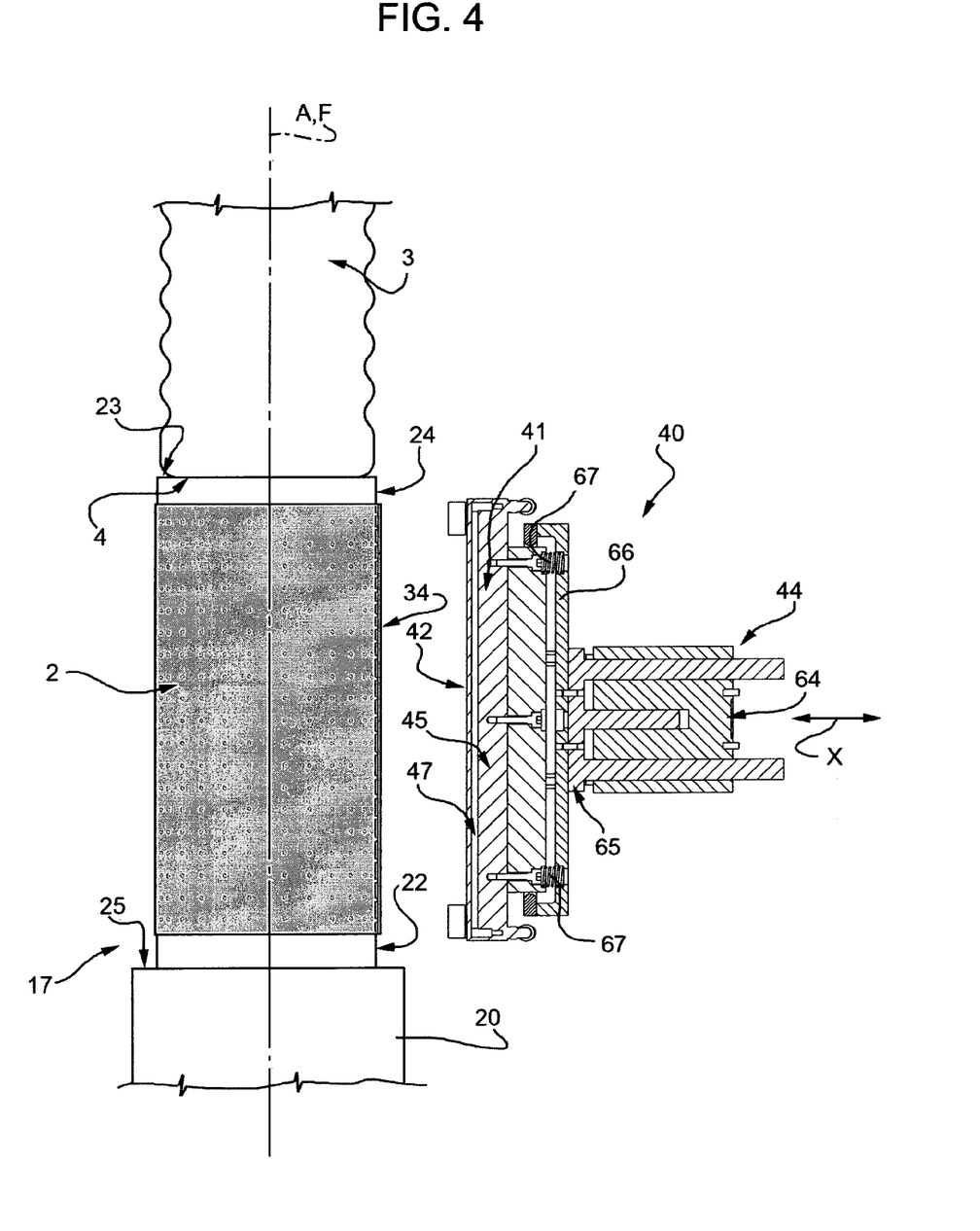
FIGS. 4 and 5 show larger-scale, partly sectioned, lateral views, with parts removed for clarity, of a current pulses welding device of FIG. 1 labelling machine, in different operating positions.
Figure 5:
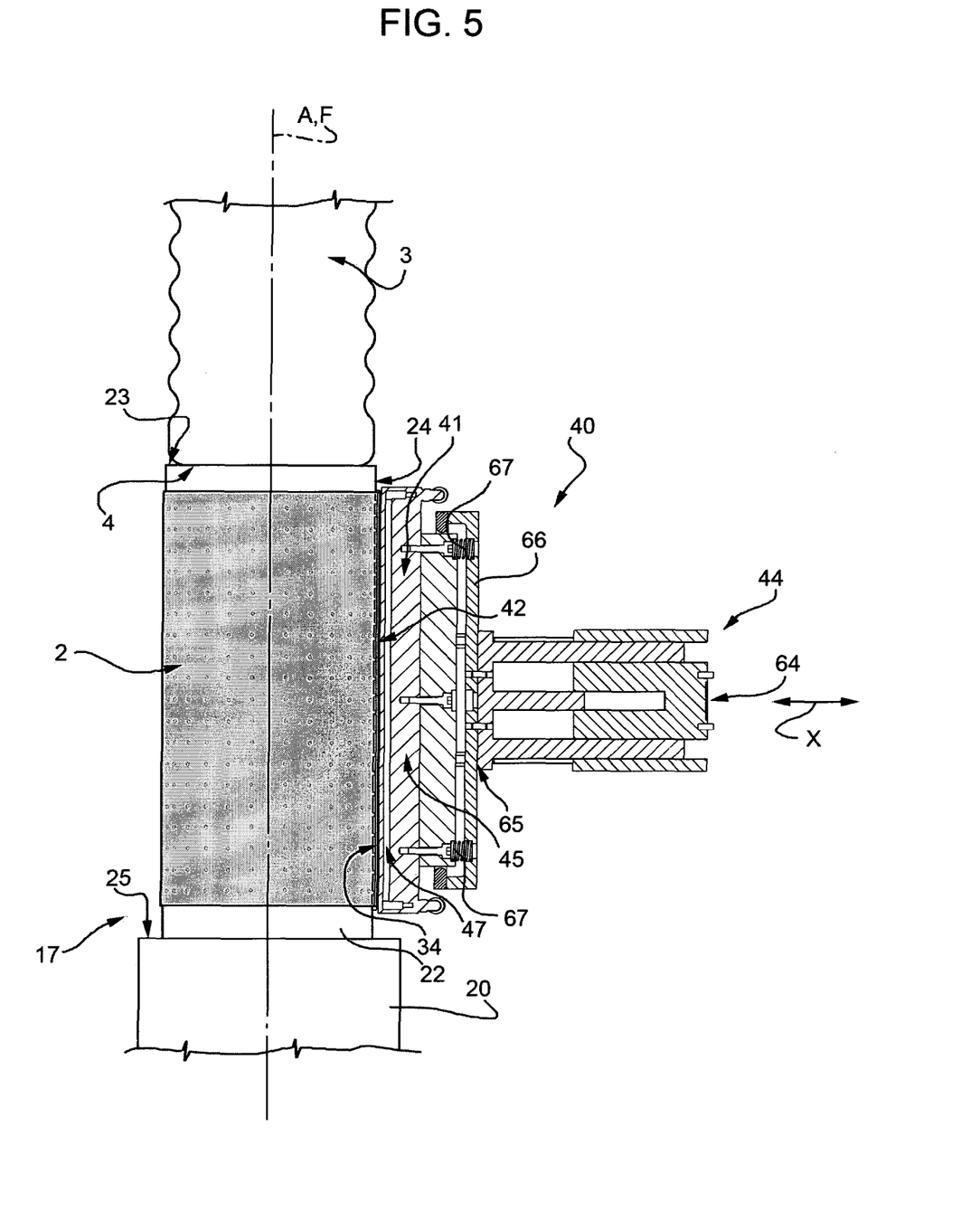

With reference to FIGS. 1, 4 and 5, each unit 15 further comprises a welding device 40 arranged in front of, and in a radially inner position than, the relative conveying module 16 and adapted to cooperate with the label 2 wrapped around the corresponding winding body 22 for welding the overlapped edges 34 and to produce a tubular configuration of such label.

Advantageously, each welding device 40 basically comprises:
- a sealing element 41 provided with a rectilinear striplike active working surface 42 having a height at least equal to the height of the overlapped edges 34 to be welded;
- electrical power supplying means 43 selectively connectable to the sealing element 41; and
- an actuator assembly 44 for moving sealing plate 41 to and from the relative overlapped edges 34 along a direction X transversal to path P.

As shown in FIG. 1, the directions X, along which sealing elements 41 move, extend radially with respect to axis B and, therefore, orthogonally to axes B-F.

Figure 6:
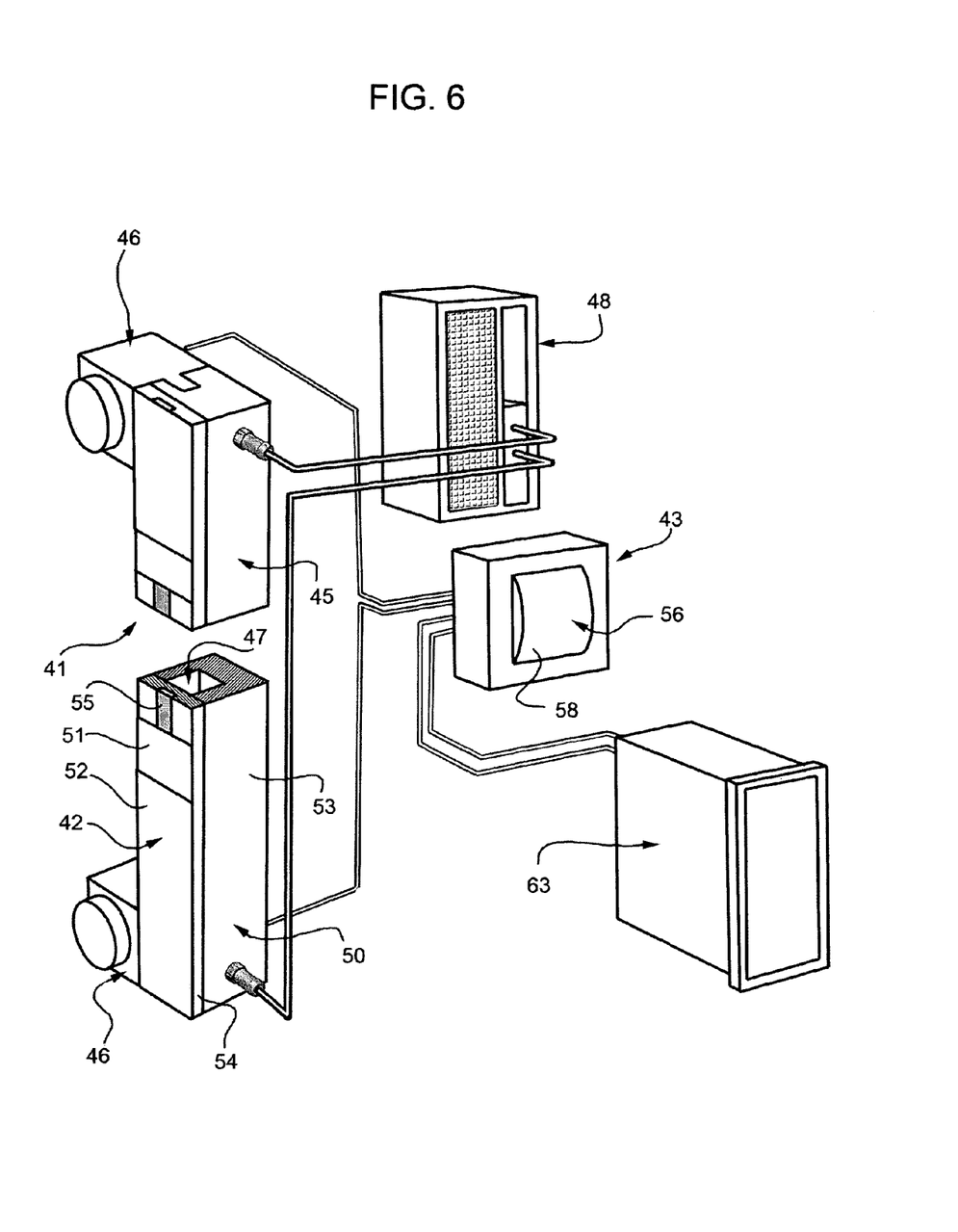
FIG. 6 shows a larger-scale, partly sectioned view in perspective of an electric heating plate of FIGS. 4 and 5 welding device together with a schematic indication of its supply connections.

With particular reference to FIGS. 4, 5 and 6, each sealing element 41 is substantially C-shaped and comprises a rectilinear bar-shaped main portion 45, defining the working surface 42, and a pair of projections 46 extending orthogonally from opposite ends of main portion 45.

More specifically, as shown in FIG. 6, the main portion 45 of each sealing element 41 is preferably formed by a longitudinal body 50, which defines internally a cooling conduit 47, continuously supplied with a refrigerant, such as water, from a cooler 48, and is externally covered by a heating layer 51, which can be heated by the electrical power supplying means 43.

In greater detail, the cooling conduit 47 is formed between a holder 53, preferably made in aluminium, and a substrate 54, preferably made in a stainless steel.

The heating layer 51, preferably made of a metal-glass mixture and having a thickness in the micron region (preferably ranging between 0.1 μm and 100 μm), is applied on the external surface of the substrate 54, opposite the one delimiting the cooling conduit 47. More precisely, at least one electrical conductive element 55, connected to the electrical power supplying means 43, is interposed between the substrate 54 and the heating layer 51.

A protective layer 52, preferably made in a glass-ceramic mixture and having, also in this case, a thickness in the micron region (preferably ranging between 0.1 μm and 100 μm), is applied over the heating layer 51 and defines the working surface 42 of the relative sealing element 41.

The two projections 46 are made in an insulating material and house the cable connections between the conductive element 55 and the electrical power supplying means 43.

Advantageously (FIGS. 6 and 8), the electrical power supplying means 43 basically comprise transformer means 56 connected to an electrical power source and adapted to generate current pulses, preferably in the region of a few hundred milliseconds, through the conductive elements 55 of sealing elements 41 so as to heat the latter in impulse mode.

Figure 8:
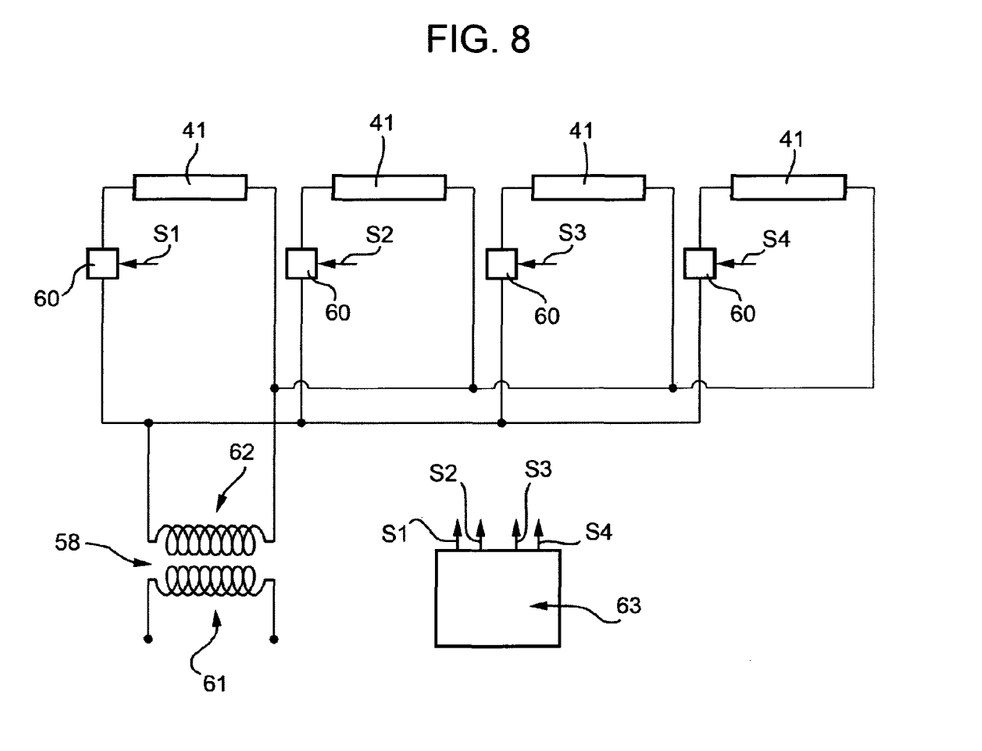
FIG. 8 shows a schematic view of an electric circuit for supplying electrical power to some welding plates of FIG. 1 labelling machine.

Advantageously, transformer means 56 comprise a number of transformers 58, each of which, as shown in FIG. 8, is connected to a plurality of sealing elements through respective switch elements 60; more specifically, each transformer 58 has a primary winding connected to the electrical power source and a secondary winding 62, to which the relative plurality of sealing elements 41 is connected in parallel through the respective switch elements 60. In the specific example shown in FIG. 8, each transformer 58 is connected to four sealing elements 41.

The applicant has observed that, at any operative cycle of the labelling machine 1, not all the sealing elements 41 are active simultaneously; consequently, the maximum number of sealing elements 41 which can be connected to one transformer 58 should not exceed the maximum number of sealing elements 41 simultaneously active during the machine operation at the maximum speed.

Each transformer 58 is controlled by a control unit 63, which receives detecting and feedback signals from the relative sealing elements 41 and from the circuit line and components connecting each sealing element 41 to the relative transformer 58, and generates command signals S1, S2, S3, S4 for the switch elements 60.

Figure 7:
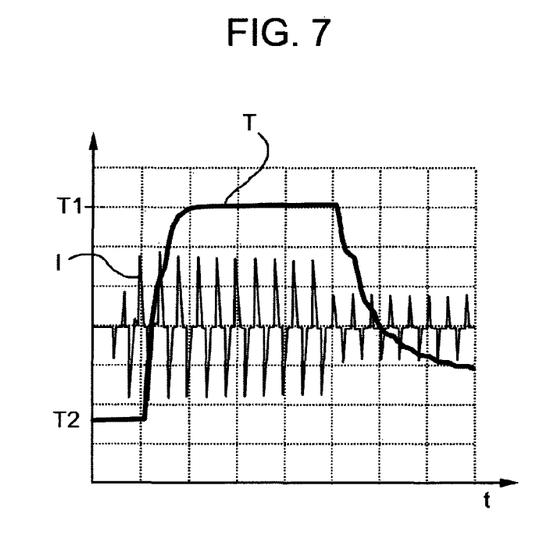
FIG. 7 shows a graph illustrating the variations of temperature and current intensity in the FIG. 6 welding plate during the labelling machine operation.

The graph of FIG. 7 shows, for each sealing element 41, the variations of temperature T and current intensity I before and during the welding step of the overlapped edges 34 of the relative label 2; as it can be easily appreciated, the times necessary for heating and cooling the working surface 42 are extremely short and the relative heating and cooling portions of the temperature curve are extremely sloping, around 6000° K/sec for heating and 3000° K/sec at the start of the cooling phase.

This is mainly due to the very low thermal mass and capacity of the heating layer 51 (being only a few μm thick) of each sealing element 41 and to its very low distance (equal to the thickness of the cover layer 52, i.e. a few μm) from the film to be welded.

Besides, the heating of each heating layer 51 in impulse mode causes no change in the length thereof.

With reference to FIGS. 4 and 5, each actuator assembly 44 basically comprises a fixed member 64, secured to the rotary frame 21 of the carousel 7, and a movable member 65, fitted to the fixed member 64 in a sliding manner along the relative direction X and carrying a corresponding sealing element 41.

In particular, the movable member 65 can be displaced, for instance through a pneumatic control, between a first position (FIG. 4), in which it maintains the relative sealing element 41 spaced from the relative conveying module 16 along the relative direction X, and a second position (FIG. 5), in which it maintains the relative sealing element 41 into contact with the label overlapped edges 34 to be welded.

Advantageously, each sealing element 41 is fastened, on the opposite side of the working surface 42, to an end flange 66 of the relative movable member 65 through the interposition of a plurality of helical springs 67 having axes parallel to the relative direction X; in this way, limited movements of the sealing element 41 with respect to the relative movable member 65 are allowed at the contact of the working surface 42 with the overlapped edges 34 to be welded so as to ensure the parallelism between the working surface 42 and the axis F of the relative winding body 22.

After completion of the welding of a tubular label 2, the downward movement of the relative winding body 22 towards the fully retracted position within the relative supporting mount 20 produces the insertion of the relative bottle 3 inside said tubular label. The so formed labelled bottle 3 is then fed to a shrinking tunnel (known per se and not shown), where shrinking and adhesion of the label 2 to the external surface of the bottle 3 occurs.

The duration of the most significant operating steps of the machine 1 is schematically shown in FIG. 1 by indicating the corresponding angles of rotation of the carousel 7 about axis B, along which said steps are performed; in particular, angle α refers to the lifting movement of the winding bodies 22 from the fully retracted position to the raised position, angle β refers to the label transfer from the input drum 10 to the relative winding body 22, angle γ refers to the welding operation on the overlapped edges 34 of the tubular labels 2, and angle δ refers to the downward movement of the winding bodies 22 to produce insertion of the bottles 3 within the corresponding tubular labels 2.

Operation of machine 1 will now be described with reference to the labelling of one bottle 3, and therefore to one unit 15, and as of the instant in which (FIG. 2):

the unlabelled bottle 3 is coaxially arranged on the relative winding body 22 and is hold in the vertical position by the combined action of such winding body 22 and the relative upper retainer 18;

the winding body 22 is in the raised position, ready to receive a relative label 2 from the input drum 10; and the movable member 65 of the relative actuator assembly 44 is in the first position (FIG. 4), in which it maintains the sealing element 41 spaced from the winding body 22 along the relative direction X.

At the transfer station 11, the input drum 10 reaches an angular position around axis D adapted to put the label 2 into contact with the winding body 22 passing through such station; thanks to the rotation of winding body 22 around its axis F and the activation/deactivation of the suction through holes 33, 32, the label 2 is wrapped in a known manner around the winding body 22 and retained thereon (FIG. 3). More specifically, the label is bent to assume a tubular configuration with the opposite vertical edges 34 overlapped one another.

At this point, the label 2 is ready to be welded along the edges 34 by activation of the welding device 40.

In particular, the movable member 65 of the actuator assembly 44 is displaced along direction X into the second position (FIG. 5) so taking the working surface 42 of the sealing element 41 into contact with the overlapped edges 34 of the label 2. Thanks to the presence of the springs 67, a limited movement of the sealing element 41 with respect to the relative movable member 65 is allowed at the contact with the label 2 so as to reach, in any condition, the parallelism between the working surface 42 and the axis F of the winding body 22.

Heating of the layer 51 of the sealing element 41 is obtained by acting on the corresponding switch element 60 so as it connects the relative conductive element 55 to the secondary winding 62 of the transformer 58, and by controlling the intensity I of the current pulses flowing along such conductive element 55, as for instance indicated in FIG. 7.

Due to the reduced thickness of the heating layer 51 and to the great proximity thereof to the film to be welded, the welding temperature is reached on the working surface 42 in a really short time (please see FIG. 7).

The sealing element 41 is heated along a given portion of the path P, sufficient to obtain melting of the overlapped films; the welding between the edges 34 is then obtained by maintaining them under the pressure exerted by the sealing element 41 onto the winding body and by cooling the sealing element 41 along a subsequent portion of the path P.

The cooling step of the sealing element 41 is achieved by controlling the intensity I of the current pulses so that the refrigerant, continuously flowing through the cooling conduit 47, produces its effect.

It is pointed out that the welding pressure, the welding temperature and the time intervals in which sealing element 41 is heated and cooled can be set by acting on the control unit 63.

Once the cooling step is completed, the movable member 65 is displaced to the first position along direction X, so detaching the sealing element 41 from the label 2.

During the last part of the path P, the winding body 22 is moved into the fully retracted position within the relative supporting mount 20, so producing the insertion of the bottle 3 inside the so formed tubular label 2.

A heat-shrinking step (not shown) can be then performed on the bottles 3 exiting from the carousel 7 to obtain shrinking and adhesion of the label 2 to the bottle external surface.

The advantages of the labelling machine 1 and the relative method according to the present invention will be clear from the above description.

In particular, thanks to the use of sealing elements (41) which can be electrically heated by current pulses, it is possible to weld a large variety of labels 2 without regard to the color used in such labels.

Besides, as the current pulses are directed to heat an extremely thin layer (51) only, a perfect controlling of the heating and cooling steps can be achieved without any risk of producing possible changes in the length of the sealing element 41.

Moreover, the welding obtained through the solution according to the present invention is aesthetically appreciable as no vertical stripes appear onto the welded edges 34.

Furthermore, the welding operation only requires a horizontal approaching movement of the sealing element 41 to the label 2 to be welded and a detaching movement along the same direction; in this way, the whole time for completing this operation is relatively short.

Thanks to the fact that each heating element 41 is connected to the movable member 65 of the relative actuator assembly 44 through a plurality of springs 67, limited movements of the heating element 41 are allowed at the contact with the label 2 to be welded so as to reach, in any condition, the parallelism between the relative working surface 42 and the axis F of the corresponding winding body 22.

Finally, since each transformer 58 is selectively connectable to a plurality of heating elements 41, it is possible to reduce the total number of components mounted on the carousel 7 with respect to known solutions.

Clearly, changes may be made to labelling machine 1 and to the method as described and illustrated herein without, however, departing from the scope of protection as defined in the accompanying claims.

The invention claimed is:

1. A tubular label applicator for applying a label to an article, the applicator comprising:

a conveying device movable along a path, the conveying device having at east one receiving unit configured to receive and retain the article to be labeled;

a feeder configured to provide the label to the receiving unit;

a winding body configured to bend the label into a tubular configuration with an axis of the winding body transverse to the path, and with opposite edges of the label parallel to the axis such that the opposite edges overlap, the winding body being movable between a retracted position within a support mount and a raised position;

at least one transformer associated with the conveying device; and at least one welding device arranged on the conveying device to weld the overlapping opposite edges of the label; the at least one welding device includes:

an electrically heatable sealing element moveable along the path, wherein the sealing element has a working surface strip oriented in a direction parallel to the axis, a longitudinal support body, a heating layer covering a surface of the support body, and an electrical conductor selectively connectable to an electrical power supply and interposed between the support body and the heating layer, the working surface strip having a height at least substantially the same height as the label bent by the winding body when the winding body is positioned in the raised position, the support body internally defining a cooling conduit used for cooling the sealing element;

the electrical power supply including the at least one transformer, the at least one transformer being selectively connectable to the sealing element and at least one other sealing element associated with a separate welding device, and wherein the at least one transformer is controlled by a control unit based on feedback signals received from the sealing element, the control unit being configured to connect the at least one transformer to the sealing element for a first predetermined period of time in order to heat the sealing element along a portion of the path for the first predetermined period of time, and to cool the sealing element along a subsequent portion of the path for a second predetermined period of time, such that the sealing element and the at least one other seal element are not heated simultaneously based on their respective positions along the path;

an actuator operable to displace the sealing element, along a direction transverse to the path and the axis, between a first position proximate the overlapped edges of the label and a second position apart from the label, the actuator including a movable member that is selectively displaced along the direction; and first and second springs for coupling the moveable member to the sealing element and to allow a degree of movement of the sealing element along the direction when the sealing element is displaced to the first position, such that the first and second springs allow the working surface and the axis of the winding body to be substantially parallel in the first position, each of the first and second springs having an axis substantially parallel to the direction, wherein the first spring couples an upper portion of the moveable member to an upper portion of the sealing element, and the second spring couples a lower portion of the moveable member to a lower portion of the sealing element.

2. The tubular label applicator of claim 1, wherein the at least one transformer is connected to an electrical power source and controlled for generating current pulses to heat the sealing element in an impulse mode.

3. The tubular label applicator of claim 2, comprising:

a plurality of units for receiving and retaining respective unlabelled articles and respective labels to be bent in a tubular configuration and to be welded by respective welding devices, wherein the electrical power supply comprises a plurality of transformers associated with the conveying device, each of which is connected to a plurality of sealing elements through respective switch elements.

4. The tubular label applicator of claim 3, wherein each transformer includes:

a primary winding connected to the electrical power source; and a secondary winding, to which the plurality of sealing elements is connected in parallel through respective the switch elements.

5. A labelling machine, comprising:

a carousel conveying device rotatable about a vertical axis along a path;

a first transfer station for transferring unlabeled bottles to the carousel;

an input drum cooperating with the carousel at a second transfer station, the second transfer station being arranged downstream of the first transfer station along the path and the carousel being adapted to receive a succession of labels from the input drum;

an output wheel cooperating with the carousel at a third transfer station, the third transfer station being arranged downstream of the second transfer station along the path, the carousel being adapted to release a succession of labelled bottles to the output wheel;

operating units mounted on the carousel and each comprising a conveying module, each conveying module being adapted to receive a bottle from the input wheel and provided with a supporting mount, each supporting mount being adapted to hold a bottle during movement along the path from the first transfer station to the third transfer station;

a winding body engaging the supporting mount and being movable between, a retracted position within a support mount, and a raised position for receiving labels having opposite vertical edges from the input drum, each winding body being rotatable for winding a label around the winding body until the opposite vertical edges of the label overlap one another;

welding devices including a welding device arranged in front of each conveying module;

impulse sealing elements each associated with one of the welding devices and defining a height at least equal to the height of the overlapping opposite vertical edges of the labels, each sealing element internally defining a cooling conduit used for cooling the sealing element;

actuator assemblies for moving each of the sealing elements into contact with and away from the overlapping opposite vertical edges of a corresponding label, the actuator assemblies each including a movable member that is selectively displaced along a direction transverse to the path and an axis of the winding body; and first and second springs for coupling each of the movable members to a respective sealing element and to allow a degree of movement of each of the sealing elements along the direction when the sealing element is displaced to a position proximate the overlapped edges of the corresponding label, such that the first and second springs allow a working surface of each of the sealing elements and an axis of the winding body to be substantially parallel when the sealing elements are displaced to the position proximate the overlapped edges of the corresponding label, each of the first and second springs having an axis parallel to the direction, wherein the first spring couples an upper portion of each of the moveable members to an upper portion of each of the sealing elements, and the second spring couples a lower portion of each of the moveable members to a lower portion of each of the sealing elements;

an electrical power supply including a plurality of transformers associated with the carousel, each transformer selectively connectable to at least first and second sealing elements, and operable to heat the first and second sealing elements along a portion of the path, and to cool the first and second sealing elements along a subsequent portion of the path, switch elements connecting each one of the transformers to the first and second sealing elements; and a control unit receiving feedback signals from the first and second sealing elements and generating command signals for the switch elements, the control unit being configured to connect each transformer to the first and second sealing elements in order to heat the first sealing element along a first portion of the path for a first predetermined time period, and to cool the first sealing element along a subsequent portion of the path for a second predetermined time period, such that the first and second seal elements are not heated simultaneously based on their respective positions along the path;

wherein the number of sealing elements connected to any one of the plurality of transformers does not exceed the number of sealing elements simultaneously active during maximum-speed operation of the labelling machine.

6. The tubular label applicator of claim 1, wherein the first and second springs are helical springs.

7. The tubular label applicator of claim 1, wherein the label has an upper portion and a lower portion with respect to the axis, and wherein the upper portion of the moveable member is horizontally aligned with the upper portion of the label and the lower portion of the moveable member is horizontally aligned with lower portion of the label.

8. The tubular label applicator of claim 1, wherein the movable member is coupled to a fixed member, and wherein the first spring is located above the fixed member with respect to the direction and the second spring is located below the fixed member with respect to the direction.

9. The labelling machine of claim 5, wherein the first and second springs are helical springs.

10. The labelling machine of claim 5, wherein the corresponding label has an upper portion and a lower portion with respect to the axis, and wherein the upper portion of a corresponding moveable member is horizontally aligned with the upper portion of the corresponding label and the lower portion of the corresponding moveable member is horizontally aligned with lower portion of the corresponding label.

11. The labelling machine of claim 5, wherein each movable member is coupled to a corresponding fixed member, and wherein each of the first springs is located above the corresponding fixed member with respect to the direction and each of the second springs is located below the corresponding fixed member with respect to the direction.

12. A tubular label applicator for applying a label to an article, the applicator comprising:

a conveying device movable along a path, the conveying device having at least one receiving unit configured to receive and retain the article to be labeled;

a feeder configured to provide the label to the receiving unit;

a winding body configured to bend the label into a tubular configuration with an axis of the winding body transverse to the path, and with opposite edges of the label parallel to the axis such that the opposite edges overlap, the winding body being movable between a retracted position within a support mount and a raised position;

at least one transformer associated with the conveying device; and at least one welding device arranged on the conveying device to weld the overlapping opposite edges of the label; the at least one welding device includes:

an electrically heatable sealing element moveable along the path, wherein the sealing element has a working surface strip oriented in a direction parallel to the axis, a longitudinal support body, a heating layer covering a surface of the support body, and an electrical conductor selectively connectable to an electrical power supply and interposed between the support body and the heating layer, the working surface strip having a height at least substantially the same height as the label bent by the winding body when the winding body is positioned in the raised position, the support body internally defining a cooling conduit used for cooling the sealing element;

the electrical power supply including the at least one transformer, the at least one transformer being selectively connectable to the sealing element and at least one other sealing element associated with a separate welding device, and wherein the at least one transformer is controlled by a control unit based on feedback signals received from the sealing element, the control unit being configured to connect the transformer to the sealing element for a first predetermined period of time in order to heat the sealing element along a portion of the path for the first predetermined period of time, and to cool the sealing element along a subsequent portion of the path for a second predetermined period of time, such that the sealing element and the at least one other seal element are not heated simultaneously based on their respective positions along the path;

an actuator operable to displace the sealing element, along a direction transverse to the path and the axis, between a first position proximate the overlapped edges of the label and a second position apart from the label, the actuator including a movable member that is selectively displaced along the direction; and first and second springs for coupling the moveable member to the sealing element and to allow a degree of movement of the sealing element along the direction when the sealing element is displaced to the first position, such that the first and second springs allow the working surface and the axis of the winding body to be substantially parallel in the first position, each of the first and second springs having an axis substantially parallel to said direction, wherein the first spring couples a first end portion of the moveable member to a first end portion of the sealing element, and the second spring couples a second end portion of the moveable member, opposite the first end portion of the moveable member, to a second end portion of the sealing element.

13. The tubular label applicator of claim 1, wherein the control unit is configured to control at least one of a welding pressure, a welding temperature, and a time interval in which the sealing element is heated and cooled.

14. The tubular label applicator of claim 1, the moveable member is not connected to the sealing element at a location in between the first and second springs.

15. The tubular label applicator of claim 1, wherein the actuator further includes a fixed member connected to a rotary frame of the conveying device, and wherein the movable member includes a flange connected to the fixed member at a first end and connected to the sealing element at a second end, the flange extending substantially parallel to the sealing element.

* * * * *